United States Patent [19]
Castritis

[11] Patent Number: 5,495,939
[45] Date of Patent: Mar. 5, 1996

[54] EJECTABLE COMPACT DISC CONTAINER

[76] Inventor: Tryfon Castritis, 421 N. Rodgo Dr., Ste. 15690, Beverly Hills, Calif. 90210

[21] Appl. No.: 418,181

[22] Filed: Apr. 7, 1995

[51] Int. Cl.$^6$ ..................................... B65D 85/57
[52] U.S. Cl. ...................... 206/307; 206/308.1; 206/313
[58] Field of Search ................................ 206/307, 308.1, 206/308.3, 313; 220/343

[56] References Cited

U.S. PATENT DOCUMENTS

| | | | |
|---|---|---|---|
| 4,655,344 | 4/1987 | Ackeret | 206/308.1 X |
| 4,664,261 | 5/1987 | Frodelius | 206/308.1 |
| 4,804,085 | 2/1989 | Ackeret | 206/308.1 |
| 5,011,010 | 4/1991 | Francis et al. | 206/308.1 X |
| 5,265,721 | 11/1993 | Castritis | 206/313 X |
| 5,360,107 | 11/1994 | Chasin et al. | 206/313 |

*Primary Examiner*—Jacob K. Ackun
*Attorney, Agent, or Firm*—Poms, Smith, Lande & Rose

[57] ABSTRACT

A compact disc container that allows the user to open the container and insert the disc into a compact disc container using only one hand is disclosed. The container includes a tray that slides along the container between a retracted position and an extended position. The user controls the sliding of the tray by sliding a knob mounted on the tray and protruding through the cover of the container. When the container is opened along one wall of the container, the tray is slid out of the container to its extended position so as to enable removal of the compact disc. A hinged panel on the tray, normally engaging the disc to support it during its travel drops down releasing the disc for insertion into a compact disc player.

11 Claims, 3 Drawing Sheets

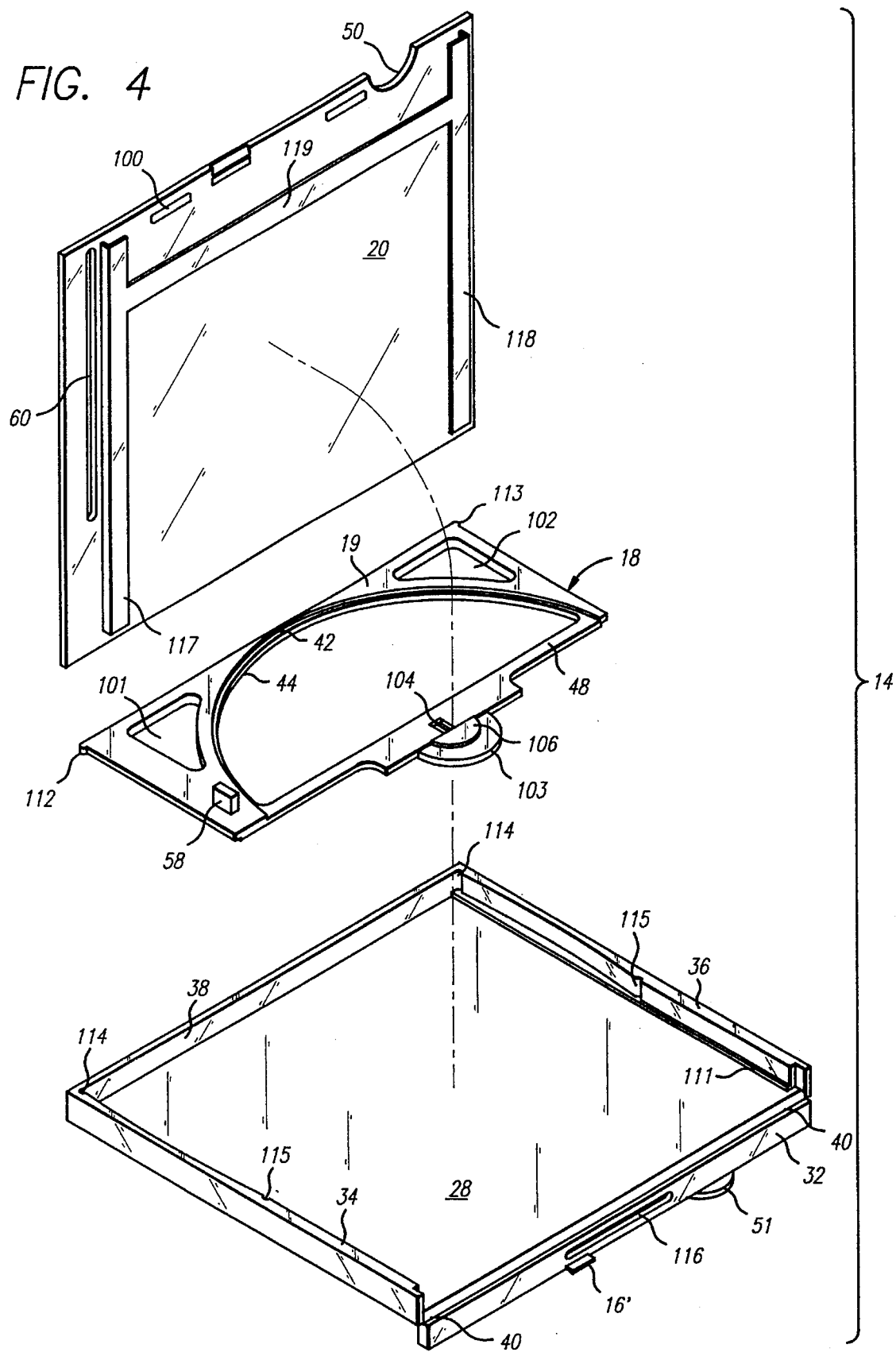

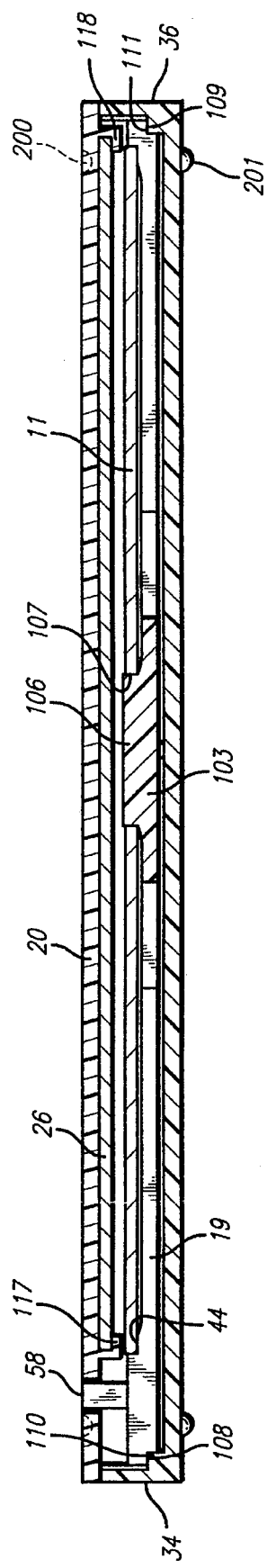
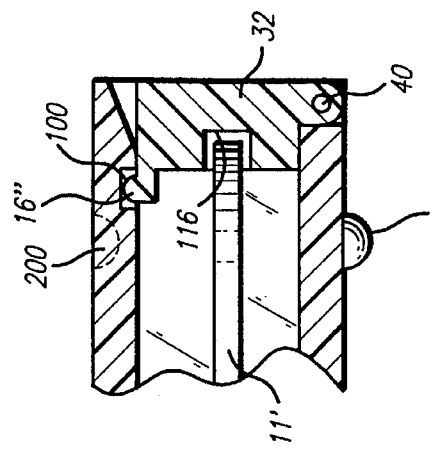
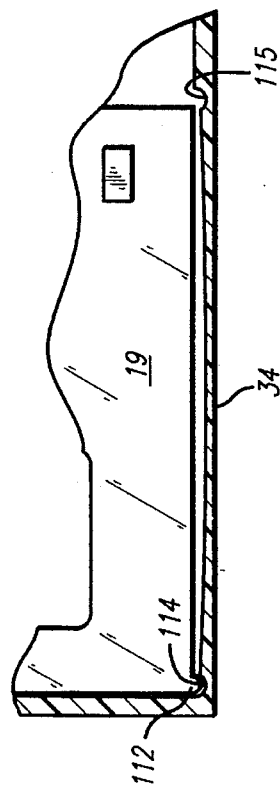

EJECTABLE COMPACT DISC CONTAINER

FIELD OF THE INVENTION

This invention relates to containers for compact discs and more particularly to containers for compact discs that enable the user to open the container and eject the disc using only one hand.

BACKGROUND OF THE INVENTION

In my U.S. Pat. No. 5,265,721, I discussed the problems that have risen in recent years in the use of compact discs in automobiles and the like. I described and claimed a solution to this problem where a container is disclosed that enables the user to open the container and remove the disc with only one hand, thereby not significantly impairing the concentration of the driver.

Although the invention in my U.S. Pat. No. 5,265,721 solves the problems discussed, there is no provision for stopping the forward movement of the disc supporting tray. There is little support for the disc when it exits the container prior to insertion into a disc player. There is thus a need for an improved compact disc container that can be operated with one hand to release a disc.

SUMMARY OF THE INVENTION

Accordingly, one object of the present invention is to provide an improved compact disc container from which the compact disc may be removed with one hand.

Another object of this invention is to provide a compact disc container that supports a disc until it is sufficiently extended out of the container so as to be insertible into a disc player.

It is still another object of this invention to provide an improved compact disc container having a tray portion supporting a compact disc wherein stops are provided when the tray portion is slid between its retracted and extended positions.

These and other objects are preferably accomplished by providing a compact disc container that allows the user to open the container and insert the disc into a compact disc container using only one hand. The container includes a tray that slides along the container between a retracted position and an extended position. The user controls the sliding of the tray by sliding a knob mounted on the tray and protruding through the cover of the container. When the container is opened along one wall of the container, the tray is slid out of the container to its extended position so as to enable removal of the compact disc. A hinged panel on the tray, normally engaging the disc to support it during its travel drops down releasing the disc for insertion into a compact disc player. The tray and bottom wall of the container having cooperating indexing means for stopping the tray with respect to the bottom wall at its fully retracted and fully extended positions.

BRIEF DESCRIPTION OF THE DRAWING

FIG. 4 is an exploded view of the compact disc container of FIGS. 1 to 3;

FIG. 5 is a view taken along lines 5—5 of FIG. 1;

FIG. 6 is a detailed cross-sectional view of a portion of the container of FIG. 1; and FIG. 7 is a detailed cross-sectional view of a portion of the container of FIG. 1.

DESCRIPTION OF THE PREFERRED EMBODIMENT

Figure 1:
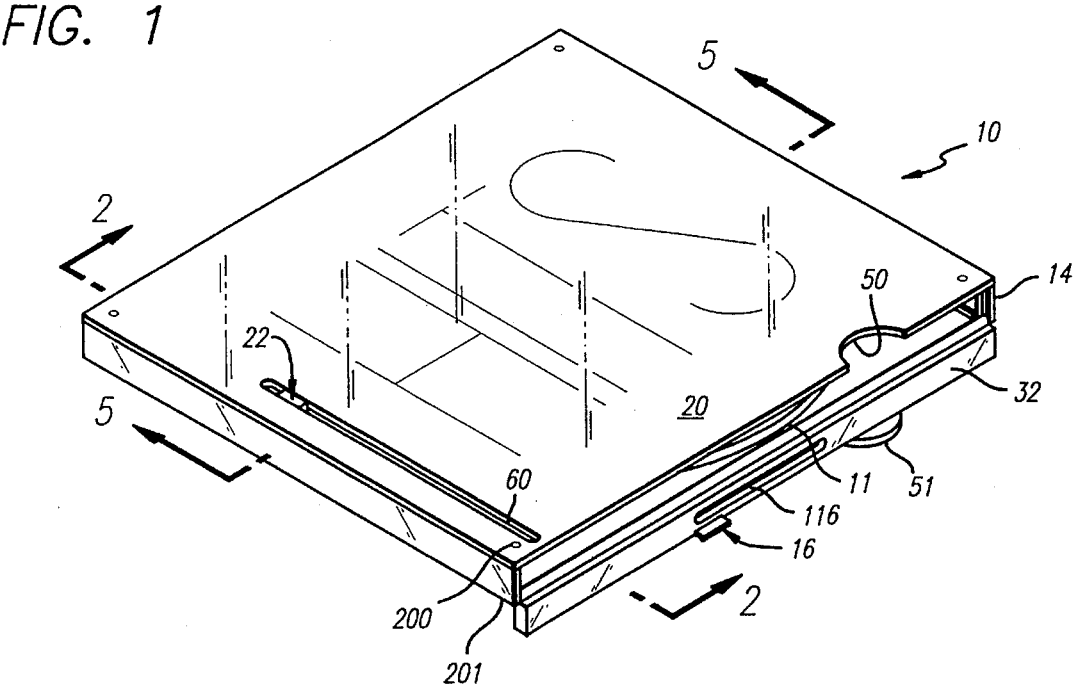
FIG. 1 is a perspective view of a compact disc container in accordance with the teachings of the invention.
Figure 2:
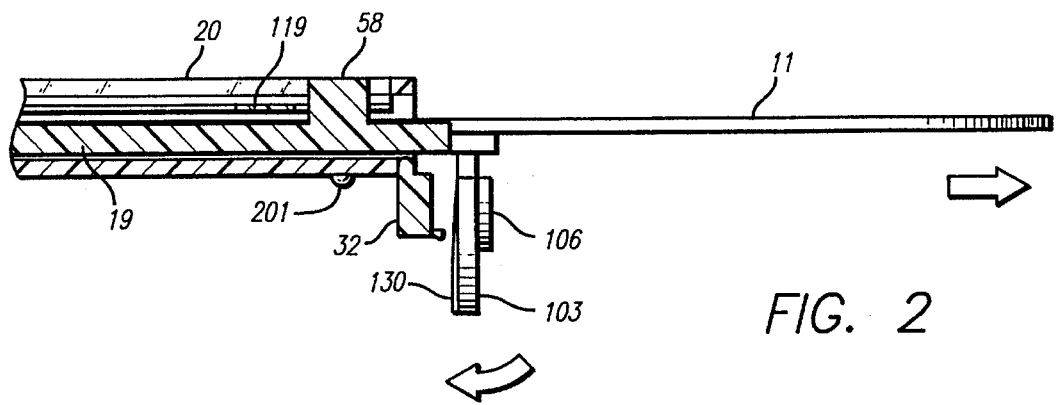
FIG. 2 is a view taken along lines 2—2 of FIG. 1 but showing a disc extending thereout.

Referring now to FIG. 1 of the drawing, an improved ejectable container 10 is shown for a compact disc 11. The container 10 is comprised of a substantially rigid box 14, a container releasable locking means 16, a compact disc tray portion 18 (FIG. 4) for supporting the compact disc with the box 14, a paper label booklet support portion 20 and a tray sliding means 22 (FIG. 1). As discussed in my U.S. Pat. No. 5,265,721, the teachings of which are incorporated herein, when sliding means 22 is moved along slot 60 (FIG. 1), door 32 opens and disc 11 (FIG. 3) exits therefrom to the final release position shown in FIG. 2. Thus, a disc 11 can be released with one hand and disc 11 can be quickly and easily inserted into a compact disc player as seen in FIG. 2 of U.S. Pat. No. 5,265,721.

Referring now to FIG. 4, box 14 comprises a base portion 28, a combination cover and booklet holder portion 20, aforementioned front wall 32, side walls 34, 36 and rear wall 38. Front wall 32 is hinged to base portion 28 via one or more hinges 40 so as to allow the front wall 32 to pivot from an open position to a closed position.

In the open position, front wall 32 extends downwardly, perpendicular to the base portion 28, as seen in FIGS. 1 through 4. In the closed position shown in FIG. 7, front wall 32 is secured by the container locking means 16 which is preferably located adjacent wall 36 so that the user can open and close front wall 32 with his left thumb while holding the container 10 in his right hand.

Releasable locking means 16 thus includes notch 50 in top cover 20 adapted to receive therein a like configured arcuate tab 51 (FIGS. 1 and 4). Releasable locking means 16 also includes tab 16' integral with front wall 32 having a protrusion 16" (FIG. 3) receivable in a notch 100 (FIG. 4) when door 32 is moved to a closed position. Thus, pushing down on tab 51 moves protrusions 16" out of slot 100 and opens door 32 to the FIG. 1 position.

Box 14 includes therein the compact disc tray portion 18 (FIG. 4) which is dimensioned so as to have a width approximately equal to one half the length of the base portion 28 as measured from front wall 32 to rear wall 38. The tray portion 18 has a main body portion 19 with cut-out sections 101, 102. Main body portion 19 includes a semi-circular cutout portion or cavity 42 having a like configured peripheral rim support 44. A front wall 48 closes off the opening leading into cavity 42. A portion of the compact disc 11 will engage cavity 42, resting on rim support 44, during storage.

A knob 58 extends upwardly from body portion 19. A semicircular flange 103 extends forwardly from wall 48 hinged thereto at hinge 104 (FIG. 4). A semi-circular boss 106 extends upwardly from flange 103. As seen in FIG. 5, boss 106 is adapted to enter the conventional round hole 107 provided in conventional compact discs, such as disc 11. Thus, the diameter of boss 106 conforms to the diameter of hole 107. As seen in FIG. 2, a fin 130 is provided on the bottom of flange 103, which cams flange 103 upwardly biasing boss 106 into engagement with the hole in compact disc 11 as it moves from its retracted to its extended position.

As seen in FIG. 5, body portion 19 is undercut on each side thereof, as at undercut areas 108, 109, respectively. These areas 108, 109 ride on shoulders 110, 111, respectively, provided along side walls 34, 36, respectively, at the bottom where the side walls 34, 36 intersect bottom wall 28 (see also shoulder 111 in FIG. 4).

As seen in FIGS. 4 and 6, the rear ends of body portion 19 terminate in outwardly extending ears 112, 113. These ears 112, 113 are adapted to snap into like grooves 114, 115 (see FIG. 6) disposed in side walls 34, 36 at spaced locations therealong (only grooves 114, 115 in wall 34 visible in FIG. 6 —see FIG. 4 for the grooves 114, 115 in wall 36). Also, as seen in FIG. 6, the thickness of walls 34, 36 varies between grooves 114, 115. That is, the thickness of each wall 34, 36 tapers from groove 114 outwardly to at least groove 115 as seen in FIG. 6 to provide a wedging action as tray portion 18 is moved from the FIG. 6 position until ears 112, 113 lock into front grooves 115 (providing a stop for tray portion 18 which is the position shown in FIG. 2).

Front door 32 (FIG. 1) also has an elongated groove 116 (see particularly FIG. 7). As seen in dotted lines, disc 11' is receivable in groove 116 which disc 11 is ejected, as will be discussed, and such groove 116 assists in easier opening of door 32 during actuation. Groove 116 spreads pressure on the door 32 evenly across the length thereof and allows the locking tab 51 to release more easily.

Top cover 20 (see particularly FIG. 4) has a pair of L-shaped spaced elongated flanges 117, 118 (see also FIG. 5) adapted to receive and support therein a booklet 26. A cross bar 119 may be provided interconnecting flanges 117, 118. Top cover 20 also includes therein an elongated slot 60 with tray sliding means 22 extending therethrough (see FIG. 1). Since top cover 20 is preferably of a transparent material, such as plastic, booklet 26 is visible and it can be easily inserted and removed for viewing. Of course, any suitable booklet holding means may be used such as set forth in my prior U.S. Pat. No. 5,265,721.

Knob 58 is preferably located in the right, rear area of tray portion 18 and is used to slide tray portion 18 along the shoulders 108, 109. Knob 58 of course protrudes through slot 60 in top cover 20. Slot 60 is dimensional so that tray portion 18 is in a fully retracted position when knob 58 is at the position in slot 60 nearest rear wall 38, and the tray portion 18 is in its fully extended position when knob 58 is in a position in slot 60 nearest front wall 32. As heretofore discussed, ears 112, 113 also snap into grooves 115 when tray portion 18 is moved to the fully extended position to provide a stop for tray portion 18 so it does not completely come out of the box 14. Slot 60 is also dimensioned to prevent dust and foreign particles from entering container 10.

Container 10 may also include a friction portion on knob 58 and stacking grooves 64 as discussed in my U.S. Pat. No. 5,265,721.

The operation of container 10 will now be discussed. The user grasps container 10 and pushes tab 51 releases locking means 16, as heretofore discussed, allowing hinged front wall 32 to pivot to the FIG. 1 position. The user can now move knob 58 along slot 60 thus sliding tray portion 18 from the FIG. 6 position, see FIG. 3, until ears 112, 113 enter grooves 115 and tab 103 drops or pivots to the FIG. 2 position. This releases box 106 form the disc 11 and the disc, still partially disposed in tray position 18, extends out of container 10 and may be inserted into a compact disc player as disclosed in my U.S. Pat. No. 5,265,721.

Figure 3:
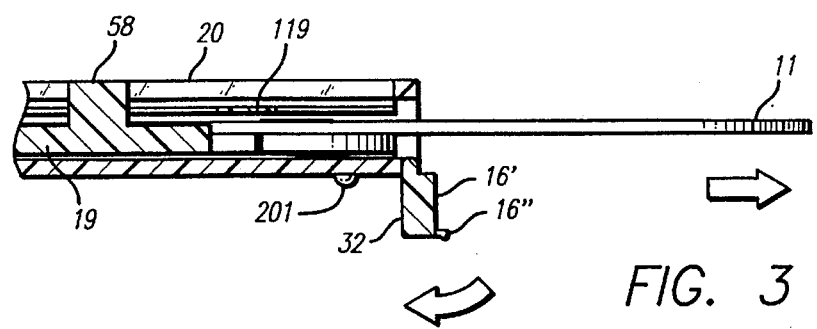
FIG. 3 is a view similar to FIG. 2 illustrating another step in the operation thereof.

Alternatively, with door 32 in the closed position shown in FIG. 7, knob 58 may be slid along slit 60 from a fully retracted position until disc 11 enters groove 116 (FIG. 7) pushing door 32 open so that it falls by gravity to the FIG. 3 position and the sliding of knob 58 is continued until disc 11 is in the FIG. 2 position.

Therefore, using only one hand, and without touching the compact disc, the compact disc container has been opened, the compact disc removed and the container closed.

If desired, a plurality of circular depressions 200, such as one in each corner (FIGS. 1, 5 and 7) may be provided on the upper surface of portion 20 adapted to reserve therein like spaced (and 20 adapted to receive therein like spaced (and a like plurality of) nubs 201 (see FIGS. 2 and 3) on the undersurface of base portion 28 so that one disc 112 may be stacked on top of another.

Having thus described exemplary embodiments of the present invention, it should be noted by those skilled in the art that the within disclosures are exemplary only and that various other alternatives, adaptations and modifications may be made within the scope of the invention. Thus by way of example, but not of limitation, the tray portion and booklet support portions may be designed with different dimensions. Also, the container may be adapted for use with other types of discs, for example laser discs. Accordingly, it is to be understood that the present invention is not limited to the precise construction as shown in the drawings and described hereinabove.

I claim:

1. An ejectable portable hand held container for storing a compact disc therein comprising:

a substantially rigid box comprising a base portion, a cover portion, a front wall, a rear wall, a right side wall, and a left side wall.

hinging means associated with the front wall and either said base portion or cover portion for hinging the front wall to a selected one of the base portion and the cover portion such that the front wall can change in configuration from an open position to a closed position;

a tray portion disposed in a parallel relationship between the base portion and the cover portion, the tray having a right edge corresponding to the right wall, a left edge corresponding to the left wall, and a rear edge corresponding to the rear wall, said tray portion having a cavity therein conforming to said compact disc adapted to receive at least a portion of said compact disc therein;

sliding means for sliding the tray portion from a retracted position within said box to an extended position extending out of said box wherein a portion of the compact disc protrudes beyond the front wall when the tray portion is in the extended position, and said tray portion having a hinged flange extending outwardly therefrom toward said front wall, said flange having a hub portion extending upwardly therefrom, said hub portion being semi-circular and adapted to extend into the center hole of a compact disc when a compact disc is disposed in said tray portion, said hinged flange being adapted to move downwardly to a position perpendicular to said tray portion when said tray portion is in the extended position.

2. In the container of claim 1 including an elongated tapered fin disposed on the underside of said flange abutting against the bottom wall of said container.

3. In the container of claim 1 wherein said tray portion has spaced sides adapted to ride on spaced shoulders associated with said right and left side walls when said tray position moves from the retracted to the extended position.

4. In the container of claim 1 wherein a first groove is provided in each of said side walls adjacent said rear wall and a second groove is provided in each of said side walls spaced from said first groove, said tray portion having spaced ears protruding on each side thereof extending outwardly therefrom receivable in said first grooves when said tray portion is in its fully retracted position and receivable in said second grooves when said tray portion is in its fully extended position.

5. In the container of claim 4 wherein said side walls taper from said first grooves toward said second grooves being thinner at said first grooves and thicker at said second grooves.

6. In the container of claim 1 wherein said cover portion has a pair of elongated spaced L-shaped flanges on its underside extending toward said tray portion adapted to receive therein a removable booklet.

7. In the container of claim 1 wherein said front wall is elongated and has an elongated groove therein opening into the interior of said container and extending parallel to the plane of said front wall at a distance above said bottom wall generally related to the distance between said cavity in said tray portion and said bottom wall whereby, when a compact disc is moved from its retracted to its fully extended position, it can enter said groove and push said front wall to open the same.

8. In the container of claim 1 including releasable locking means associated with said cover and said front wall including a tab integral with said front wall extending inwardly of said front walls, said cover portion having a cutout portion where said front wall meets said cover portion configured to said tab for receiving said tab therein.

9. In the container of claim 8 wherein said releasable locking means further including a locking member on said front wall adapted to engage a mating locking member on said cover.

10. In the container of claim 1 including cooperating indexing means on the underside of said base portion and on the upper surface of said cover portion for stacking one disc on top of another to prevent sliding thereof.

11. In the container of claim 10 wherein said cooperating indexing means includes a plurality of spaced depressions on said upper surface adapted to receive therein a like plurality of similarly spaced nubs on said underside.

* * * * *